United States Patent [19]

Brown et al.

[11] 4,240,570
[45] Dec. 23, 1980

[54] DISPENSING DEVICE WITH INTERCHANGEABLE VALVES PROVIDING FREE POUR AND MEASURED POUR

[76] Inventors: Edward M. Brown, 128 Passaic Ave., Livingston, N.J. 07039; Edward J. Towns, Normandy Heights Rd., Convent Station, N.J. 07961

[21] Appl. No.: 7,013

[22] Filed: Jan. 29, 1979

[51] Int. Cl.³ .............................................. G01F 11/38
[52] U.S. Cl. ...................................... 222/442; 222/453
[58] Field of Search ............... 222/442, 443, 448, 449, 222/450, 453

[56] References Cited

U.S. PATENT DOCUMENTS

| 1,256,298 | 2/1918 | Cremona | 222/38 |
|---|---|---|---|
| 1,454,572 | 5/1923 | Walters | 222/442 |
| 2,133,679 | 10/1938 | Woeltjen | 222/442 |
| 2,504,145 | 4/1950 | Morrone | 222/38 |
| 2,566,669 | 9/1951 | Lesnick | 222/153 |
| 2,703,666 | 3/1955 | Iannelli | 222/447 |
| 2,722,345 | 11/1955 | Van Buren | 222/453 X |
| 2,858,052 | 10/1958 | Costakos | 222/453 X |
| 2,902,250 | 9/1959 | Bering | 222/453 X |
| 3,080,097 | 3/1963 | Schmaus | 222/189 |
| 3,598,284 | 8/1971 | Wessely | 222/38 |
| 3,606,084 | 9/1971 | Morrone | 222/38 |

*Primary Examiner*—F. J. Bartuska

[57] ABSTRACT

A vented housing has a tubular inlet for receiving liquid from a container and for venting the container. The housing provides a measured volume determined by the inlet position in the housing. An upper valve engages the inlet and a lower valve linked to the upper valve engages a discharge port for discharging the measured volume. The upper valve closes the inlet when the measured volume is dispensed through the discharge port. The upper valve is removable to provide a continuous pour mode. The upper valve when closed has a valve clearance sufficiently small to cut off vent action to the container to stop the flow of liquid through the inlet and sufficiently large to permit sliding action of the valve within the inlet without significant mechanical pressure contact between the valve and the inlet.

10 Claims, 8 Drawing Figures

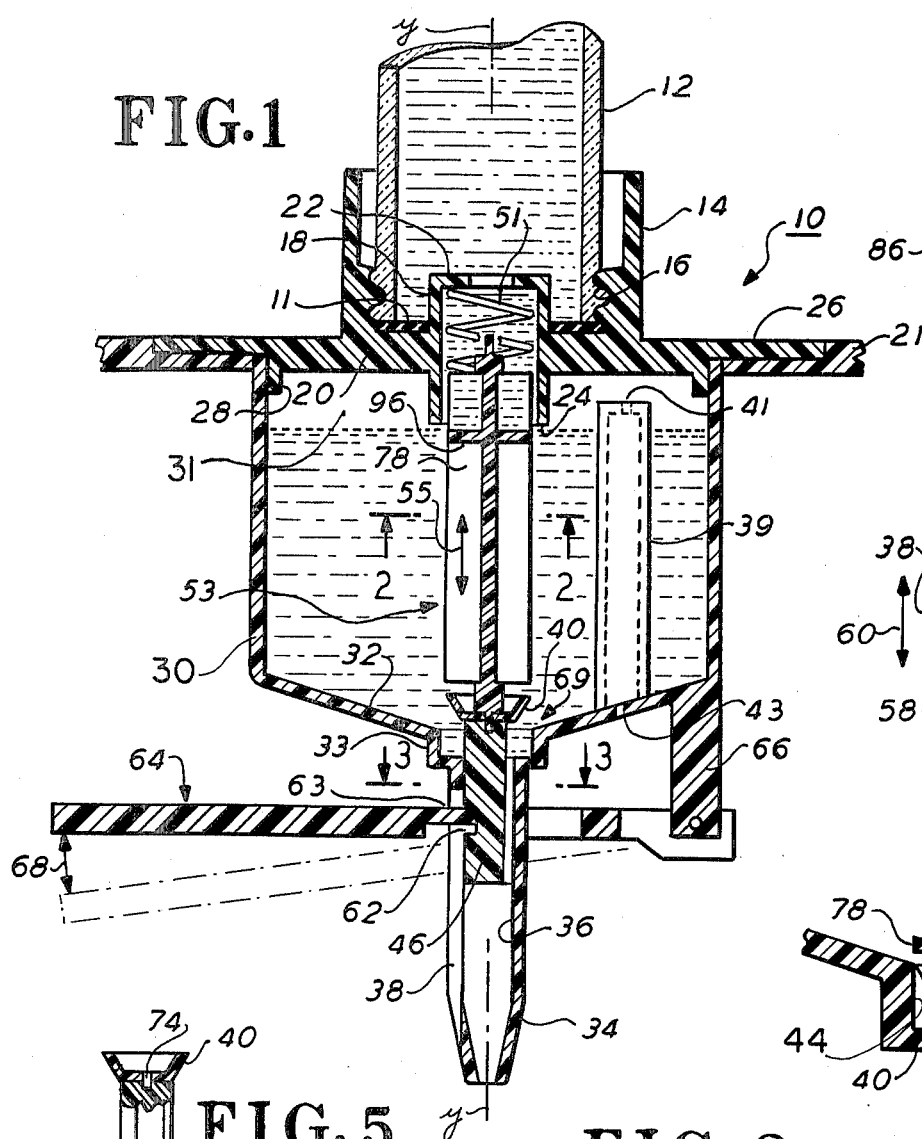
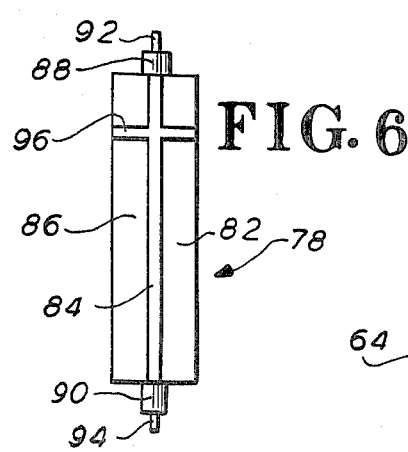
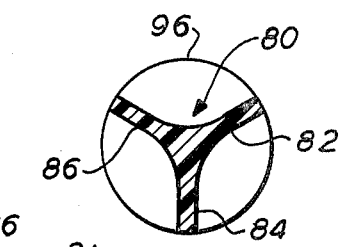
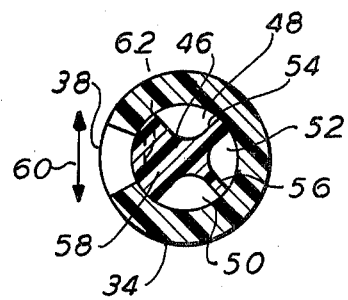
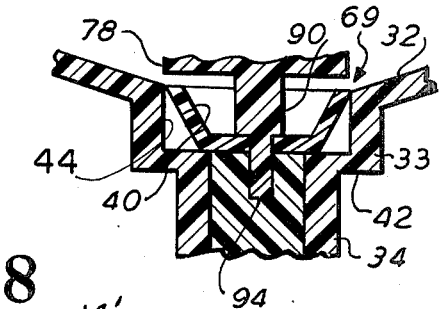
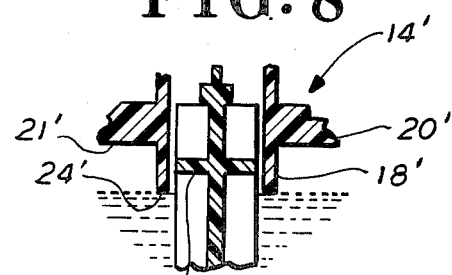
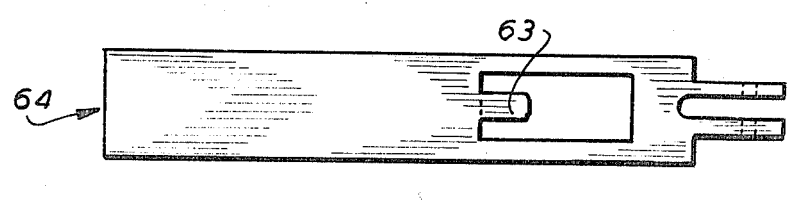

DISPENSING DEVICE WITH INTERCHANGEABLE VALVES PROVIDING FREE POUR AND MEASURED POUR

The present invention relates to liquid dispensing and measuring devices.

Certain dispensing and measuring valve mechanisms for liquids utilize a dual valve system. In this system an upper valve opens and closes an inlet port between an inverted liquid container and a device measuring chamber beneath the container. A second lower valve dispenses measured liquid from the measuring chamber. The valves are axially aligned and may be operated by a single actuating lever. One problem with such a system is that the valves may be mounted for independent motion. The motions of one valve do not necessarily follow exactly the motions of the other valve. If rigidly connected together slight variations in tolerance or wear may result in one valve not seating fully and the other remaining ajar. As a result, each of the valves are independently spring biased. This results in a relatively complex structure.

Some systems may use a tapered valve, others ball check systems, and others a variety of other arrangements including O-rings in piston arrangements. All of these require, however, that the valve be firmly and properly seated by means of mechanical pressure in the valve seat in a leak tight fit to prevent leakage from the container or from the measuring chamber. Such pressure may result in wear and eventual leakage.

A liquid dispensing device in which venting action occurs in an inlet port embodying the present invention includes a valve in the inlet port for dispensing and venting which has a valve aperture of a given cross-section area and shape and a valve member of restricted cross-section substantially the same shape as the aperture and having a cross-section area less than the aperture cross-section area by an amount such that the difference in areas between the two have a value which is effective to stop venting action through the valve and sufficiently great to permit sliding action between them without any substantial mechanical pressure.

In the Drawing:

FIG. 1 is an elevation sectional view through a device embodying the present invention, FIG. 2 is a plan sectional view through a portion of the device of FIG. 1 taken along lines 2—2, FIG. 3 is a sectional plan view through the device of FIG. 1 taken along lines 3—3, FIG. 4 is an enlarged elevation sectional view through the lower valve of the device of FIG. 1 when closed, FIG. 5 is a side elevation partially fragmented view of a portion of the actuating mechanism of the device of FIG. 1, FIG. 6 is a side elevation view of a reversible interchangeable connecting link used to connect the upper and lower valves in the device of FIG. 1, FIG. 7 is a plan view of the operating lever of the actuating mechanism of FIG. 1, and FIG. 8 is a side elevation sectional view of the upper valve of the device of FIG. 1 in a second embodiment.

In FIG. 1, a liquid dispensing and measuring device 10 is connected to a source of liquid such as a bottle 12. The interior of bottle 12 when secured to the device 10 is completely sealed from the ambient via gasket 11. The bottle 12 and device 10 when in the operating position, are oriented as shown in FIG. 1, i.e., the bottle 12 is inverted with its opening facing downward.

The device 10, as will be described, can provide a continuous pour of the contents of the bottle 12 for as long a time period as desired and can also provide premeasured quantities of liquid. The device can be placed easily and quickly in either of these operating modes or can be left in one or the other of the modes. In addition, the device can provide different measured quantities. All of these features may be achieved with few operating but interchangeable parts.

Device 10 includes a cylindrical cap 14 which may be molded of thermoplastic material. The cap 14 has threads 16 which are designed to have a universal fit with most bottles of a given configuration, that is, narrow neck, wide neck or the like.

An inner cylindrical tubular member 18 is centrally positioned in the bottom wall 20 of cap 16. The tubular member 18 may extend above and below the wall 20. The central axis y of the cylinder formed by member 18 is aligned in the vertical direction coaxial with threads 16. Upper end of member 18 has an inwardly radially extending flange 22. Member 18 may depend downwardly from wall 20 a predetermined amount. The lower edge 24 of member 18 determines the measured liquid volume as will be explained. Extending radially outwardly from wall 20 is a circular flange 26 which mounts the device to support 21. Depending downwardly from flange 26 is a cylindrical wall 28.

Mounted to the outer surface of cylindrical wall 28 and abutting against flange 26 is cup shaped housing 30 which may be cylindrical. The housing 30 forms a fluid storage and measuring chamber 31 and may be releaseably secured to the wall 28. In this case, the parts have a sufficiently close fit to keep the parts together by friction but can be separated manually. Depending downwardly from housing 30 bottom wall 32 is valve seat 33 and elongated nozzle 34. Seat 33 preferably is a conical or cylindrical cup and is centered on the y axis. Nozzle 34 forms a conduit 36 through which liquid stored in the housing 30 is dispensed. A slot 38 is formed in one side of the nozzle 34. Housing 30, seat 33 and nozzle 34 preferably are integral and molded from thermoplastic material.

Housing 30 vent 39 is formed of a tubular member upstanding from bottom wall 32 of housing 30. The vent 39 has a venting aperture 41 at the upper end within chamber 31 and another venting aperture 43 in bottom wall 32 that is open to the ambient but sealed from chamber 31 at the junction of the vent 39 with wall 32. The aperture 41 is preferably above the valve seat 33 a distance that is greater than the distance between the lower edge 24 of tube 18 and the seat 33. That is, aperture 41 is located between edge 24 and wall 20. When chamber 31 is in the measuring mode, liquid filling the chamber reaches the edge 24 of tubular member 18. When this occurs venting action through tube 18 to the bottle 12 stops and no more liquid can flow into the chamber 31. Aperture 41 should be above that level, that is, above edge 24, so that no liquid flows into aperture 41 through the vent 39 to the ambient. This action forms a predetermined measured quantity in chamber 31.

The valve actuating mechanism comprises compression coil spring 51 mounted in tubular member 18, link and valve assembly 53, valve 40, plunger 46, and lever 64. Spring 51, assembly 53, valve 40, and plunger 46 are mounted axially along axis y and are operated in directions 55. The valve 40 and assembly 53 serve as a dual valve mechanism and are operated in ganged fashion.

Plunger 46 may have a cross-section as shown in FIG. 3. The plunger 46 is an elongated member having a number of axially extending fluid passage grooves 48, 50 and 52. The grooves 48, 50 and 52 form a pair of axially extending legs 54 and 56 which slideably engage nozzle 34 conduit 36. The portion 58 of the plunger is solid across an arcuate extent in directions 60 an amount sufficient to cover the slot 38 and engage the nozzle 34 side wall on that side. A recess 62 is formed in the plunger 46 for engaging tongue 63 of actuating lever 64. The lever 64 is pivotally mounted to an extention 66 depending from bottom wall 32. The lever 64 is pivoted in the directions 68. The dashed line position is its normal quiescent position as biased by spring 51.

Mounted to the upper end of the plunger 46 which could be either releasably secured thereto or molded integral therewith out of thermoplastic material is dispensing valve 40. The valve 40 may be molded as a thin flexible cup such that it resiliently seals in a fluid tight relationship against the upstanding wall 44 of the seat 33 when the plunger 46 is in its lower-most position. Formed in the upper end of the plunger 46 is an axially extending bore 74 (FIG. 5).

Link assembly 53 includes link 78 formed of a generally Y shaped body 80 (FIG. 2) in section having three axially extending legs 82, 84 and 86 which appear in FIG. 2 as radially outwardly extending spokes. Depending axially from body 80 at one end is a cylindrical boss 88 and a boss 90 along the same axis at the other end. The bosses may be identical and serve to space the valve 40 from body 80 legs. Identical pins 92 and 94 extend axially respectively from bosses 88 and 90. Each of the pins 92 and 94 closely mates bore 74 in a friction fit to form an integral unit which can be manually separated. The legs 82, 84 and 86 form fluid passages therebetween to permit liquid to flow through tubular member 18 when link 78 is within member 18.

A disc 96 having a circular periphery is formed integral with the body 80 of link 78. The disc 96 has an outer diameter that is slightly smaller than the inner diameter of the tubular member 18. For example, there may be an 0.005 inch clearance between the two when the liquid has an alcohol content such as conventional whiskeys. This clearance serves as an important valve function. When the disc 96 is moved close to edge 24 of member 18, the effective clearance therebetween is at a sufficiently small value such that no venting action of ambient air from the chamber 31 of housing 30 can enter that clearance space to vent the interior of the bottle 12. It should be emphasized that a tight mechanical pressure or contact seal is not necessary to achieve this action. Since no venting air can enter the bottle 12 interior when this critical clearance is present, then no liquid will flow out of the bottle 12 into the chamber 31 through member 18.

The disc 96 therefore can slide along the y axis within member 18 to any desired position within the member 18, maintain its clearance with member 18, and still perform a valve action that effectively seals the liquid in the bottle 12 from the chamber 31. Thus the disc 96 position with respect to the chamber 18 is not critical as occurs in some pressure type valves.

The above feature is important in a dual action system such as in the present embodiment in which the valve 40 is fixed to common supporting link 78. The valve 40 when seated and closed should result in the valve formed by disc 96 and member 18 being open. This permits chamber 31 to fill. In the converse, when the valve formed by disc 96 and member 18 is closed, the valve 40 should open. Because the disc 96 can be positioned anywhere within the tubular member 18, its exact position with respect to the tubular member is not critical to achieve the valve action between valve 40 and its seat 33.

Link 78 is reversible with respect to the plunger 46, either pin 92 or pin 94 may be inserted in bore 74. In FIG. 1, pin 94 is in bore 74, disc 96 is spaced adjacent member 18 in the closed valve position and the valve 40 is open. The valve disc 96 is spaced from member 18 in the closed position at most that critical distance at which effective venting action to the bottle 12 ceases. In FIG. 1, disc 96 is spaced beneath the edge 24 while in the closed state. This illustrates that in some embodiments the critical distance for stopping the venting action can be achieved with the disc outside of the tubular member 18, remembering that what is critical is the spacing of the disc with respect to the member 18 for the purpose of forming a vent clearance. To this extent, the disc 96 does not necessarily have to be within the member 18 bore to achieve the close valve action. Also the disc does not have to be a plane member but could be of other shapes.

The disc 96 should be sufficiently close but beyond that critical vent stopping clearance value in the normally open state so that when the valve 40 is opened, the valve formed by disc 96 and member 18 is closed relatively quickly. This prevents the flow of liquid from the bottle 12 to the chamber 31 after the lower valve lid is opened to ensure an accurate measured pour of the premeasured volume of liquid from chamber 31 through nozzle 34.

Ordinary manual operation of lever 64 will occur in a matter of a fraction of a second, which will be sufficient for most disc 96 spacings. Regardless of the disc position along the y axis, as long as it is placed in the closed valve position (at the critical spacing from member 18) when the lever 64 is actuated to the solid line position, the disc could be in any spaced relationship to member 18 when in the normally open state. The valve 40 should be displaced to the open state an amount sufficient to permit a reasonable flow rate of the liquid from chamber 31 through the nozzle 34.

In the normal quiescent state valve 40 is closed and the valve formed by disc 96 is open. Coil spring 51 biases link 78 in this normally closed position. By moving lever 64 from the normal quiescent state (dashed line) to the dispensing position (solid line) the valve 40 opens and the valve formed by disc 96 closes. The tongue 63 in lever recess 62 engages the plunger 46, and thus link 78 during this valve action.

In the aforementioned arrangement of disc 96 with respect to the member 18, the liquid from bottle 12 is effectively sealed from chamber 31 when valve 40 is opened. Therefore, only the liquid in chamber 31 is dispensed. This is the volume formed by the distance of edge 24 from bottom wall 32 (and valve 40). By providing a number of different interchangeable caps 14 for use with housing 30 in which the edges 24 are spaced different respective distances from the lower surface of wall 20 of that cap, different measured volumes can be provided. The housing 30 being interchangeable with the caps 14, readily forms different measuring volumes therewith.

If it should be desired to provide a continuous pour, that is to permit the contents of the bottle 12 to continuously pour through the nozzle 34 without a measured volume such as might be desired in the case of wines or other liquids, then the link 78 may be reversed from its position of FIG. 1. To do this the housing 30 is first separated from cap 14. Then the link 78 is reversed. In this reversed position, pin 92 is inserted in bore 74. Here the disc 96 is spaced closer to valve 40 than in the other position and is remote from tubular member 18. When valve 40 is placed in the open valve position as shown in FIG. 1, disc 96 remains beyond the closed valve effective clearance distance from the member 18, thus venting action to bottle 12 is always present regardless the valve 40 state.

As mentioned above, when interchangeable caps 14 are provided with different length tube members 18, the edges 24 will be at different spacings from the valve 40. However, since the disc 96 slides within the tubular member and all of the tubular members of the different caps are provided the same interior cylindrical diameter, then as long as the disc forms an open valve with the longest member 18 (smallest volume) between edge 24 and wall 20 and a closed valve with the shortest member 18 between edge 24 to wall 20 (largest volume) then a single assembly 53 and link 78 can be used with the different tube lengths. By locating disc 96 a certain distance from boss 88, it can be positioned to closed and open valve states with a variety of edge 24 spacings from wall 20.

An example of a different length tube member is illustrated in FIG. 8. In FIG. 8 Cap 14¹ has a bottom wall 20¹ whose lower surface 21¹ is spaced a greater distance from edge 24¹ than the lower surface of wall 20 from edge 24, FIG. 1. In FIG. 8 lever 64, positioned in solid line, places disc 96 inside of tubular member 18¹. The measured volume here is less than in the embodiment of FIG. 1. Note that disc 96 and link 78 slide within tube member 18¹ maintaining the spaced clearance therebetween as discussed above.

In the alternative, different links such as 78 can be provided with the valve discs such as 96 placed at different positions along the length thereof in the different respective links. In this case only the links need be interchanged to provide different measured volumes with a single cap and housing.

Relatively few operating parts can be provided for a measuring and dispensing device to provide a number of different measuring and dispensing configurations. All of the parts being molded of thermoplastic material can be manufactured relatively inexpensively.

It should be noted that, while the clearance of about 0.005 inches forms the effective vent stopping clearance for alcoholic liquids with molded thermoplastics with smooth surfaces it is apparent that other clearances may be provided for other liquids of different viscosities and other materials and surface conditions. In this embodiment the surfaces are all relatively smooth. Surface texture of the valve elements is also a factor. Also, the venting action of ambient air through a port in which a liquid is flowing in the opposite direction as the vented air is a function of the liquid viscosity and surface tension among the other parameters mentioned. Thus the effective clearance for achieving a venting action for a given liquid will vary in accordance with the characteristics of that liquid and of the surface properties of the tube 18 and disc 96 as they interact with the liquid. What is critical is not the absolute value of the clearance but the spaced relationship of the disc 96 from the tubular member 18 for a given liquid. An advantage of this system is, since there is no significant mechanical pressure between the upper valve members, there is substantially no wear and thus possibilities of leakage due to wear obviated. It is possible that some contact between disc 96 and tube 18 cavity will occur. This contact generally will be localized and is permissible.

What is claimed is:

1. A liquid dispensing device comprising:
   a housing for storing liquid,
   a liquid receiving inlet means connected to the housing said means having an aperture of a given cross-section area and shape centered about and extending along an axis,
   a first valve member having said given shape and a cross-section area sufficiently less than said given area to stop the flow of liquid through the inlet means when said aperture acts as a vent for said liquid,
   a valve stem connected to said valve member adjacent one end of the stem and extending along said axis, one end of said stem being within said aperture, said stem including first and second spaced connecting means at opposite ends thereof, said first connecting means being adjacent said first valve member,
   an actuating plunger including a second valve member, said plunger including means mating with said first and second connecting means for selectively releaseably securing said first and second connecting means thereto,
   a valve seat mating with said second valve member coupled to said housing centered about said axis,
   a vent opening in the housing, and
   actuating means connected to the housing and said plunger for moving the stem and said plunger along said axis, said first and second valve members being in spaced relationship so that one valve is open and the other closed when said second connecting means is secured to said plunger securing means, said spaced relationship being such that only said second valve member and seat engage in a closed valve position when the first connecting means is secured to said plunger.

2. The device of claim 1 wherein said inlet means is a tube which extends into the housing terminating a first distance from said valve seat, said vent opening being positioned a second distance from said seat greater than said first distance.

3. The device of claim 2 wherein said vent includes a tube mounted at one end adjacent said valve seat and open to the ambient at the one end, the tube being open to the housing interior at the other end.

4. The device of claim 1 further including means for receiving a source of liquid in sealed fluid engagement with said aperture.

5. A liquid dispensing device comprising:
   a fluid storing housing,
   fluid inlet and discharge conduits coupled to said housing,
   a valve actuating plunger moveable in said discharge conduit, said plunger including connecting means,
   a valve seat coupled to said housing adjacent said discharge conduit,
   a first valve member on said plunger which mates with said valve seat to provide open and closed valves in accordance with the position of the plunger in said discharge conduit, a valve link including a second valve member adjacent one end, said second valve member cooperating with said inlet conduit to form an inlet valve, said link including first and second connecting means each releasably selectively mating with the plunger connecting means, said second valve member engaging said inlet conduit means to form said inlet valve when one of said first and second connecting means and plunger connecting means are engaged and a continuously open inlet conduit is obtained when the other of said first and second connecting means and plunger connecting means are engaged.

6. The device of claim 5 wherein said inlet conduit extends along a given axis, said second valve member being aligned along said given axis, said device further including means for axially displacing said link along said axis so that said second valve member can slide within the aperture of said inlet conduit when in the closed valve position.

7. The device of claim 5 wherein said inlet conduit forms a hollow cylindrical opening and said second valve member is a circular disc having a diameter smaller than the diameter of said opening.

8. The device of claim 5 wherein said housing includes a bottom wall and an annular side wall, said valve seat being coupled to said bottom wall, a vent opening including a hollow member upstanding from said bottom wall, the upstanding end of the hollow member being open to the housing interior and the other lower end of the member hollow being open to the ambient.

9. The device of claim 8 wherein said inlet conduit depends into the chamber of said housing terminating at a first distance from said first valve member, said hollow vent opening in the housing interior being spaced from said first valve member a second distance greater than said first distance.

10. The device of claim 9 further including spring means in said inlet conduit for resiliently urging said first valve member against said seat.

* * * * *